United States Patent [19]

Shimada

[11] Patent Number: 4,651,165

[45] Date of Patent: Mar. 17, 1987

[54] RECORDER

[75] Inventor: Tsutomu Shimada, Musashino, Japan

[73] Assignee: Canon Kabushiki Kaisha, Tokyo, Japan

[21] Appl. No.: 751,543

[22] Filed: Jul. 3, 1985

[30] Foreign Application Priority Data

Jul. 10, 1984 [JP] Japan ................. 59-141300

[51] Int. Cl.⁴ ............................. G01D 15/10
[52] U.S. Cl. ................. 346/76 PH; 346/105; 400/120
[58] Field of Search .......... 346/76 PH, 105, 106; 400/120, 225, 229, 233, 234, 236; 219/216 PH

[56] References Cited

U.S. PATENT DOCUMENTS 4,444,521 4/1984 Richard et al. ............ 346/76 PH
4,468,139 8/1984 Hattori ..................... 346/76 PH

FOREIGN PATENT DOCUMENTS 57-91280 6/1982 Japan ..................... 346/76 PH

Primary Examiner—Arthur G. Evans
Attorney, Agent, or Firm—Fitzpatrick, Cella, Harper & Scinto

[57] ABSTRACT

A recorder comprises cam means rotatably mounted on a carriage and having first and second synchronously rotated cams, head shift means for shifting up and down a record head in response to the movement of the first cam, take-up means for taking up an ink ribbon, and transmission means for transmitting the movement of the carriage to the take-up means in response to the movement of the second cam to cause the take-up means to take up the ink ribbon.

10 Claims, 5 Drawing Figures

RECORDER

BACKGROUND OF THE INVENTION

1. Field of the Invention

The present invention relates to a recorder which can shift a record head to a lower position in which the record head contacts or approaches a record paper and an upper position in which the record head is moved away from the record paper.

2. Description of the Prior Art

In a sliding head type printer such as a thermal transfer printer, an up/down shift operation of a print head and a take-up operation of an ink ribbon have the following relation. In a print mode, the print head is contacted to a print paper and the ink ribbon is taken up. In a non-print mode, the contact of the print head to the print paper is released and the ink ribbon is not taken up. In this manner, the up/down shift operation of the print head and the take-up operation of the ink ribbon are correlated.

In the prior art thermal transfer printer, however, the up/down shift operation of the print head and the take-up operation of the ink ribbon were carried out by separate systems. The prior art thermal transfer printer has separate up/down shift control system for the print head and take-up control system for the ink ribbon. Therefore, the construction is complex and manufacturing cost is high.

Further, since the prior art thermal transfer printer shifts the print head up or down by a solenoid, a large noise is generated.

SUMMARY OF THE INVENTION

It is an object of the present invention to provide a simple up/down shift structure for a record head with a high efficiency.

It is another object of the present invention to provide a single control system for up/down shifting of a record head and taking up of an ink ribbon.

It is other object of the present invention to optimize a timing of up/down shifting of a record head and a timing of taking-up of an ink ribbon.

Other objects of the present invention will be apparent from the following description of the invention.

DETAILED DESCRIPTION OF THE PREFERRED EMBODIMENTS

Figure 1:
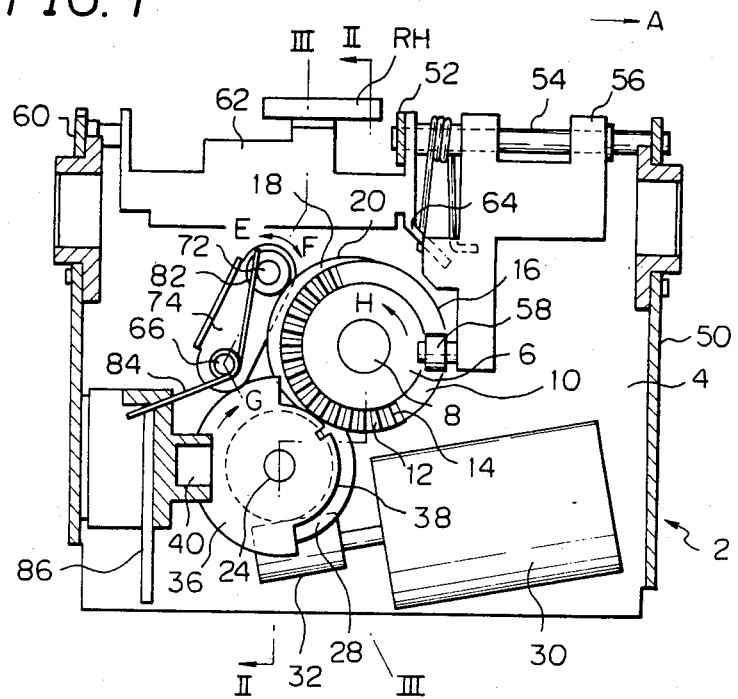
FIG. 1 is a plan view of a carriage of a thermal printer in accordance with one embodiment of the present invention.
Figure 2:
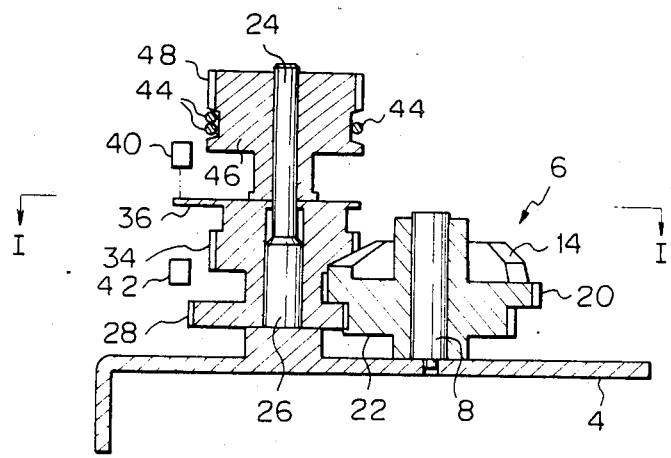
FIG. 2 is a longitudinal section view taken along a line II—II in FIG. 1.
Figure 3:
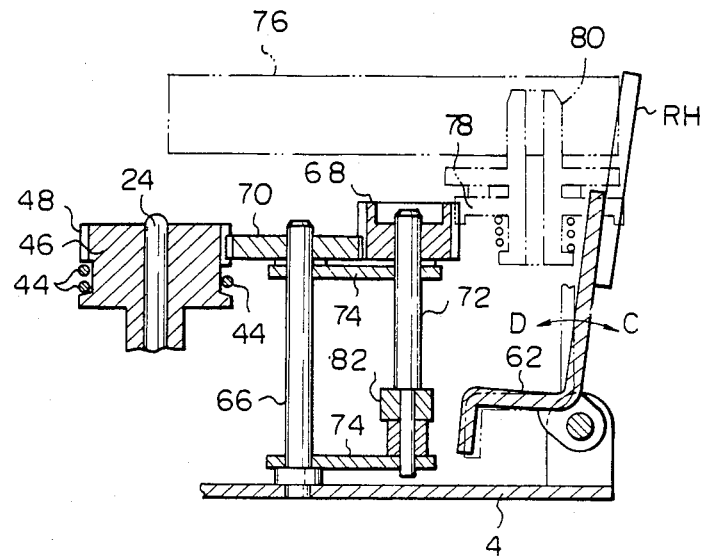
FIG. 3 is a longitudinal sectional view taken along a line III—III in FIG. 1.

FIG. 1 is a plan view of a carriage of a thermal transfer printer in accordance with one embodiment of the present invention, FIG. 2 is a longitudinal sectional view taken along a line II—II in FIG. 1, and FIG. 3 is a longitudinal sectional view taken along a line III—III in FIG. 1. As shown in FIG. 2, a cam wheel 6 is rotatably mounted by a cam shaft 8 fixed to a bottom plate 4 of a carriage 2. The cam wheel 6 has a first cam or an end surface cam 14 which has a flat portion 10 (FIG. 1) and a raised portion 12 on an end surface (upper surface), and a second cam or circumferential cam 20 which has a circumferential surface portion 16 and a horizontally extended portion 18. A cam wheel gear 22 is mounted on the cam shaft 8 (FIG. 2) so that the cam wheel 6 is rotated as the cam wheel gear 22 rotates.

A stepped shaft 24 is fixed to the bottom plate 4. A first gear 28 which meshes with the cam wheel gear 22 and a worm wheel 34 which meshes with a worm-gear 32 (FIG. 1) of a DC motor 30 which is cam wheel drive means fixed to the bottom plate 4 are arranged in union. A position detection plate 36 is fixed to the top of the worm wheel 34 and rotatably supported by a larger diameter portion 26 of the stepped shaft 24. The cam wheel gear 22 and the first gear 28 have the same number of teeth so that the rotation angles of the position detection plate 36 and the cam wheel 6 are always equal.

As shown in FIG. 1, the position detection plate 36 has a notch 38 over 160–170 degrees of an outer periphery of a disk. A light emitting device 40 and a sensor 42 which is a cam wheel position sensor are arranged to face each other on the opposite sides of the position detection plate 36 at the outer periphery thereof. The light emitting device 40 normally emits a light to the sensor 42. As the position detection plate 36 rotates and the notch 38 thereof reaches the area of the light emitting device 40 and the sensor 42, the sensor 42 is turned on, and when the portion of the position detection plate 36 which has no notch 38 passes the area of the light emitting device 40 and the sensor 42, the light is interrupted and the sensor 42 is turned off. The position detection plate 36, light emitting device 40 and sensor 42 form cam wheel position detection means.

Figure 4:
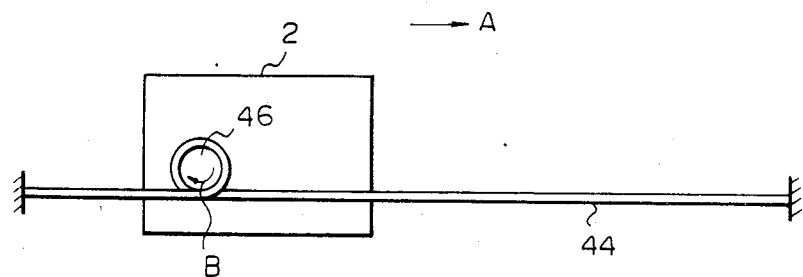
FIG. 4 illustrates movement of the carriage.

A pulley 46 having a wire 44 wound thereon and a second gear 48 are rotatably supported by the stepped shaft 24. The other end of the wire 44 is fixed externally of the carriage. As shown in FIG. 4, when the carriage 2 is moved in a direction A, the pulley 46 on which the wire 44 is wrapped is rotated in a direction B and the second gear 48 is also rotated.

As shown in FIG. 1, a shaft 54 extends between a right side plate 50 and a middle side plate 52 of the carriage 2, and an up/down shift transmission member 56 is fixed to the shaft 54. The up/down shift transmission member 56 has a first cam follower 58 which slidably contacts to the end surface cam 14.

A head pressing member 62 is swingably arranged between the shaft 54 and a left side plate 60 of the carriage 2. A projection 64 of the head pressing member 62 engages with the up/down shift transmission member 56 so that when the up/down shift transmission member 56 is rotated around the shaft 54, the head pressing member 62 is rotated in a direction C or D shown in FIG. 3 to contact a record head RH to a record paper (not shown) or release the contact of the record head RH to the record paper. The up/down shift transmission member 56 and the head pressing member 62 form head swing means.

As shown in FIGS. 1 and 3, a second vertical shaft 66 is fixed to the bottom plate 4. An idle gear 70 which meshes with the second gear 48 and a ribbon cassette drive gear 68 are rotatably supported by an end of the second vertical shaft 66. A third vertical shaft 72 is fixed to a swingable member 74 which is swingably supported by the second vertical shaft 66. The ribbon cassette drive gear 68 which meshes with the idle gear 70 and a friction gear 78 of a ribbon cassette 76 is rotatably supported by the third vertical shaft 72.

The second vertical shaft 66, ribbon cassette drive gear 68, idle gear 70, third vertical shaft 72 and swingable member 74 form ink ribbon take-up means.

The friction gear 78 is provided on a reel 80 which engages with a take-up (not shown) of the ribbon cassette 76. As the friction gear 78 is rotated, the reel 80 is also rotated so that the ink ribbon in the ribbon cassette 76 is taken up.

A second cam follower 82 which slidably contacts to the circumferential cam 20 is rotatably supported at a bottom of the third vertical shaft 72. A spring 84 wound on the second vertical shaft 66 presses the third vertical shaft 72 and a vertical plate 86 mounted on the bottom plate 4. By the biasing action of the spring 84, the second cam follower 82 normally contacts to the circumferential cam 20.

The operation is now explained. FIG. 1 shows the position of the carriage 2 in a non-print mode. Since the first cam follower 58 mounted on the up/down shift transmission member 56 abuts against the flat portion 10 of the end surface cam 14, the head pressing member 62 which engages with the up/down shift transmission member 56 is retracted to a position shown by double-dot chain lines in FIG. 3 so that the head (not shown) is spaced from the print paper.

The second cam follower 82 mounted on the third vertical shaft 72 abuts against the horizontally extended portion 18 of the circumferential cam 20 so that the swingable member 74 is retracted in a direction E shown in FIG. 1 around the second vertical shaft 66. Thus, the ribbon cassette drive gear 68 mounted at the top of the third vertical shaft 72 is disengaged from the friction gear 78.

As the carriage 2 is moved in the direction A shown in FIG. 4 by a drive source (not shown), the pulley 46 on which the wire 44 externally of the carriage 2 is wrapped is rotated with the second gear 48. This rotation is transmitted to the idle gear 70 and the ribbon cassette drive gear 68. Thus, the ribbon cassette drive gear 68 is rotated, but the friction gear 78 which is disengaged from the ribbon cassette drive gear 68 is not rotated and the ink ribbon in the ribbon cassette 76 is not taken up.

In the print mode, the DC motor 30 is energized by a command from a CPU (not shown) and the rotation of the DC motor 30 is transmitted to the worm wheel 34 supported by the larger diameter portion 26 of the stepped shaft 24 through the worm gear 32 so that the position detection plate 36 is also rotated in a direction G shown in FIG. 1 The cam wheel 6 is rotated in a direction H shown in FIG. 1 by the cam wheel gear 22 which meshes with the first gear 28. Since the gear ratio of the first gear 28 and the cam wheel gear 22 is unity, the position detection plate 36 and the cam wheel 6 are rotated by the same rotation angle by the rotation of the DC motor 30.

When the position detection plate 36 is rotated by 100–120 degrees from the position shown in FIG. 1, the notch 38 of the position detection plate 36 comes to the position between the light emitting device 40 and the sensor 42.

The cam wheel 6 is also rotated by 100–120 degrees from the position shown in FIG. 1 and the first cam follower 58 abuts against the raised portion 12 of the end surface cam 14. As a result, the up/down shift transmission member 56 and the head pressing member 62 are rotated in the direction C shown in FIG. 3 so that the head is brought into contact with the print paper.

Since the second cam follower 82 abuts against the circumferential surface portion 16 of the circumferential cam 20, the swingable member 74 is slightly rotated in the direction F shown in FIG. 1 around the second vertical shaft 66 and the ribbon cassette drive gear 68 meshes with the friction gear 78.

As the carriage 2 is moved in the direction A shown in FIG. 4, the pulley 46 on which the wire 44 externally of the carriage 2 is wrapped is rotated with the second gear 48. This rotation is transmitted to the idle gear 70 and the ribbon cassette drive gear 68 so that the ribbon cassette drive gear 68 is also rotated. The friction gear 78 is also rotated because the friction gear 78 now engages with the ribbon cassette drive gear 68. Accordingly, the ink ribbon in the ribbon cassette 76 is taken up.

When the position detection plate 36 and the cam wheel 6 are rotated by 100–120 degrees from the positions shown in FIG. 1, the head is contacted to the print paper and the ribbon cassette drive gear 68 meshes with the friction gear 78 of the ribbon cassette 76. Thus, the printing is done by the head while the ink ribbon is taken up as the carriage 2 is moved.

As described above, when the position detection plate 36 is rotated by 100–120 degrees, the notch 38 of the position detection plate 36 comes to the position between the light emitting device 40 and the sensor 42 so that the light emitted from the light emitting device 40 is not interrupted but reaches the sensor 42 to turn on the sensor signal, which is sent to the CPU (not shown). The CPU responds to the sensor signal to deenergize the DC motor 30.

In the print mode, the position detection plate 36 and the cam wheel 6 are rotated by 100–120 degrees from the positions shown in FIG. 1. Thus, the ink ribbon is taken up as the carriage 2 is moved and the head which is now contacted to the print paper prints characters on the print paper.

In order to shift to the non-print mode from the print mode, the DC motor 30 is energized by a command from the CPU to rotate the position detection plate 36 and the cam wheel 6 to the positions shown in FIG. 1. Under this condition, the head is moved away from the print paper and the ribbon cassette drive gear 68 is disengaged from the friction gear 78. Thus, the ink ribbon is not taken up.

When the position detection plate 36 again comes to the position shown in FIG. 1, the light emitted from the light emitting device 40 is interrupted and the sensor 42 is turned off. This sensor signal is sent to the CPU. The CPU responds to the sensor signal to deenergize the DC motor 30.

When the carriage 2 is moved in the direction A in the positions shown in FIG. 1, the head is moved away from the print paper and the ink ribbon is not taken up.

Figure 5:
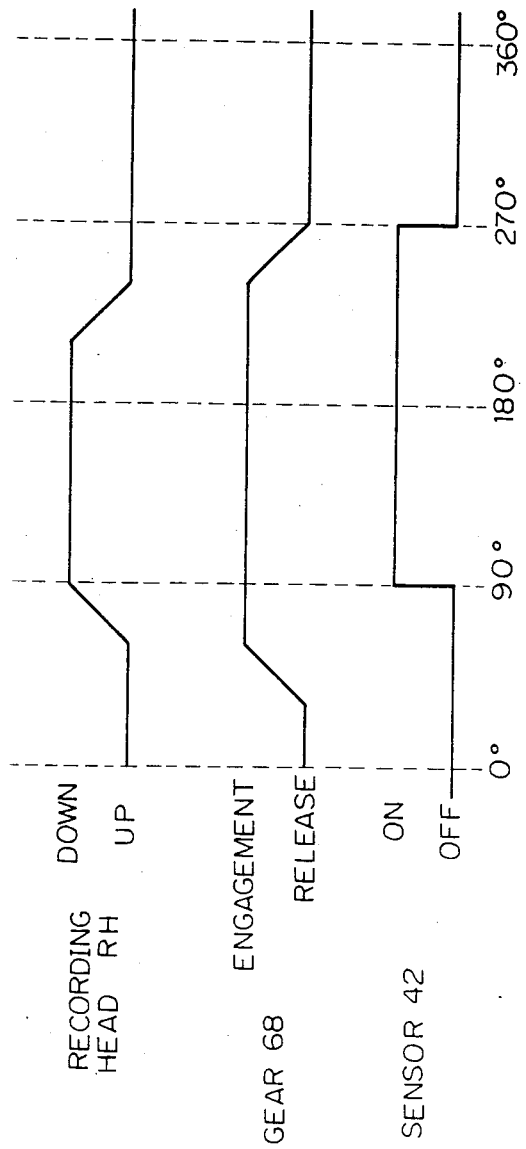
FIG. 5 is a timing chart showing timings of on/off of a photo-sensor, up/down of a head and engage/release of a ribbon feed gear.

FIG. 5 shows timings of on/off of the sensor 42, up/down shift of the record head RH and ribbon cassette drive gear 68. The positions shown in FIG. 1 are assumed as reference positions (0°). In the positions of FIG. 1, when the cam wheel 6 rotates in the direction H, the gear 68 is moved to mesh with the friction gear 78. Then, the record head RH is shifted down to press the print paper through the ink ribbon. The timings of the gear 68 and the record head RH are staggered because the take-up speed of the ink ribbon is slow at a start-up stage and the print paper may be rubbed by the ink ribbon and contaminated if the record head is shifted down at this stage. Therefore, the record head is shifted down after the relative movement between the ink ribbon and the print paper has ceased. The gear 68 is released from the gear 78 after the head RH has been shifted up in order to eliminate loosening of the ribbon which is caused when the head is shifted from the down position to the up position.

The present invention is not limited to the illustrated embodiments. For example, the first cam and the second cam of the cam wheel may be separate so long as they are synchronously rotated.

What is claimed is:

1. A recording apparatus comprising:
   recording means for recording on a record sheet using an ink sheet;
   drive force receiving means for receiving a drive force that moves the ink sheet;
   drive force transmitting means for transmitting the drive force to said drive force receiving means;
   displacing means for displacing said recording means between a recording position, wherein said recording means can effect recording, and a retracted position, wherein said recording means is retracted from the recording position; and
   drive means having a common drive source for connecting said drive force receiving means and said drive force transmitting means to each other and causing said displacing means to displace said recording means to the recording position after said drive force receiving means and said drive force transmitting means have been connected to each other.

2. Apparatus according to claim 1, wherein displacement of said drive force transmitting means by said drive source effects the connection between said drive force receiving means and said drive force transmitting means.

3. Apparatus according to claim 1, wherein said recording head is mounted on a moveable carriage, and wherein the drive force for moving the ink sheet is provided to said drive force transmitting means by movement of the carriage.

4. Apparatus according to claim 1, wherein after recording on the record sheet is effected, said common drive source disengages said drive force receiving means and said drive force transmitting means and causes said displacement means to displace said recording means to the retracted position prior to disengagement of said drive force receiving means and said drive force transmitting means.

5. Apparatus according to claim 1, further comprising detection means responsive to said displacing means for detecting the position of said recording means and for controlling said drive means in response thereto.

6. Apparatus according to claim 1, wherein said common drive source comprises a D.C. motor.

7. Apparatus according to claim 1, wherein said drive means comprises cam means including first and second synchronously rotable cam means, said first cam means effecting said displacement of said recording means, and said second cam means effecting the connection of said drive force transmitting means to said drive force receiving means.

8. Apparatus according to claim 1, wherein said recording means includes a thermal transfer printer.

9. Apparatus according to claim 1 wherein said drive force receiving means further comprises:
   ink sheet supply means;
   ink sheet take-up means;
   reel means for cooperating with said take-up means to advance the ink sheet from said supply means to said recording means for recording and then to said take-up means; and
   friction gear means rotatably engaged to said reel means and adapted for engagement with said drive force transmitting means.

10. Apparatus according to claim 1, wherein said drive force transmitting means further comprises gear means including an idle gear and an ink sheet drive gear, said ink sheet drive gear being engaged with said idle gear and swingable thereabout from a retracted position to position of engagement with said drive force receiving means.

* * * * *